Patented Dec. 22, 1942

2,305,734

UNITED STATES PATENT OFFICE 2,305,734

CALCIUM HYDROXY FORMATE AND PROCESS OF PRODUCTION

Erich Rabald, Mannheim-Waldhof, and Fritz Johannessohn, Mannheim-Feudenheim, Germany, assignors to Rare Chemicals, Inc., Nepera Park, N. Y., a corporation of New York No Drawing. Application February 20, 1940, Serial No. 319,892. In Germany January 11, 1937

11 Claims. (Cl. 260—542)

Our invention relates to therapeutic organic salts of calcium and refers particularly to calcium organic salts of this character having high calcium content.

In the therapeutic application of organic salts of calcium, it is frequently desirable to use such salts having a high content of calcium, in order that the effect of the calcium may be obtained by a minimum quantity of the calcium salt.

It is also evident that the therapeutic salt must be non-toxic, that it should be freely soluble in water and that its aqueous solution be free from excessive acid or alkaline reactions.

Various calcium salts having high calcium content have been suggested for this purpose, among which are calcium oxide, calcium hydroxide, calcium hydrid and calcium cyanide, but none of these are capable of therapeutic use on account of their toxicity and strong alkalinity.

We have found, however, that a new organic salt of calcium, possessing high calcium content, freely soluble in water without excessive acidity or alkalinity and non-toxic, can be obtained by reacting upon formic acid, neutral calcium formate and calcium acid formate with calcium oxide.

We have found that by the reaction between equal moles of formic acid and any of its mentioned compounds and calcium oxide there is produced a new compound, calcium hydroxyformate having the formula; Ca(OH)OCHO.

We give the following as examples of methods adapted for the production of our new compound:

Example 1

28 grams calcium oxide are placed into a flask with reflux condenser and 200 cc. of an 11.5% aqueous solution of formic acid are added. After the reaction is completed, the mixture is cooled down and the formed, colorless crystalline calcium hydroxyformate, Ca(OH)OCHO, is collected on a filter, and dried. The chemical reaction is represented by the following formula:

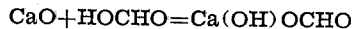

Example 2

130 grams calcium formate are dissolved in sufficient quantity of water and under continuous stirring 56 grams calciumoxide are added. The mixture warms up considerably. After cooling the crystalline calciumhydroxyformate is collected on a filter and dried.

The chemical reaction is represented by the following formula:

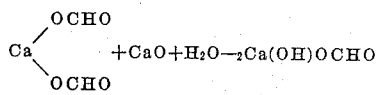

We do not limit ourselves to the particular chemicals, times, temperatures, quantities and steps of procedure specifically mentioned as these are given solely for the purpose of clearly describing our invention.

What we claim is:

1. The process of obtaining a calcium salt of formic acid which comprises reacting 1 mol of calcium oxide with 1 mol of a member of the group consisting of formic acid and the calcium salts of formic acid.

2. The process of obtaining a calcium salt of formic acid which comprises reacting 1 mol of calcium oxide with 1 mol of a member of the group consisting of formic acid and the neutral and acid calcium salts of formic acid.

3. The process of obtaining a calcium salt of formic acid which comprises reacting 1 mol of calcium oxide with 1 mol of formic acid.

4. The process of obtaining a calcium salt of formic acid which comprises reacting 1 mol of calcium oxide with 1 mol of neutral calcium formate.

5. The process of obtaining a calcium salt of formic acid which comprises reacting 1 mol of calcium oxide with 1 mol of acid calcium formate.

6. The process of obtaining a calcium salt of formic acid by reacting 1 mol of formic acid in aqueous solution with 1 mol of calcium oxide under a reflux condenser, collecting the calcium hydroxyformate thus formed on a filter and drying the product.

7. The process of obtaining a calcium salt of formic acid by reacting 1 mol of calcium formate in aqueous solution with 1 mol of calcium oxide, collecting the calcium hydroxyformate thus produced on a filter and drying the product.

8. The calcium salt of formic acid produced by reacting 1 mol of calcium oxide with 1 mol of a member of the group consisting of formic acid and the calcium salts of formic acid, which product forms a white crystalline powder, is non-toxic, possessing therapeutic properties and is freely soluble in water with a slightly alkaline reaction.

9. As a new product calcium hydroxyformate with 1 mol of water of crystallization a white crystalline powder of the formula

10. As a new product calciumhydroxyformate, a white powder of the formula Ca(OH)OCHO.

11. The process of obtaining a calcium salt of formic acid by reacting 1 mol of calcium oxide with 1 mol of a member of the group consisting of formic acid and the calcium salts of formic acid in aqueous solution under a reflux condenser, collecting the calcium hydroxyformate thus formed and drying the product.

ERICH RABALD.
FRITZ JOHANNESSOHN.